United States Patent
Dumain et al.

(10) Patent No.: US 6,472,071 B2
(45) Date of Patent: Oct. 29, 2002

(54) BURNISH RESISTANT POWDER COATING COMPOSITION

(75) Inventors: Eric Dumain, Hillsborough, NC (US); Alan Toman, Apex, NC (US); Goro Iwamura, Raleigh, NC (US)

(73) Assignee: Reichhold, Inc., Research Triangle Park, NC (US)

( * ) Notice: Subject to any disclaimer, the term of this patent is extended or adjusted under 35 U.S.C. 154(b) by 0 days.

(21) Appl. No.: 09/906,432

(22) Filed: Jul. 16, 2001

(65) Prior Publication Data

US 2002/0001677 A1 Jan. 3, 2002

Related U.S. Application Data

(62) Division of application No. 09/386,882, filed on Aug. 31, 1999, now Pat. No. 6,310,139.

(51) Int. Cl.$^7$ .................. B32B 15/08; B32B 27/06; B32B 27/28
(52) U.S. Cl. .............. 428/423.1; 428/425.8; 428/482; 427/195; 427/385.5; 427/386; 427/388.2
(58) Field of Search .......... 427/195, 385.5, 427/386, 388.2; 428/423.1, 425.8, 482; 525/124, 131, 176, 934

(56) References Cited

U.S. PATENT DOCUMENTS

| | | | |
|---|---|---|---|
| 2,857,354 A | 10/1958 | Fang et al. ............... 260/33.2 |
| 3,058,947 A | 10/1962 | Fryling et al. ............... 260/43 |
| 3,758,632 A | 9/1973 | Labana et al. ............... 260/836 |
| 3,781,379 A | 12/1973 | Theodore et al. ............ 260/836 |
| 3,888,943 A | 6/1975 | Labana et al. ............... 260/836 |
| 3,939,127 A | 2/1976 | Labana et al. ......... 260/78.4 D |
| 4,091,049 A | 5/1978 | Labana et al. ............... 260/836 |
| 4,137,277 A | 1/1979 | Nordstrom et al. .......... 260/835 |
| 4,242,253 A | 12/1980 | Yallourakis ............. 260/40 TN |
| 4,499,239 A | 2/1985 | Murakami et al. ........... 525/111 |
| 4,510,288 A | 4/1985 | Meyer et al. ................. 525/111 |
| 4,522,975 A | 6/1985 | O'Connor et al. ........... 524/702 |
| 4,698,426 A | 10/1987 | Meyer et al. ................ 544/253 |
| 4,818,791 A | 4/1989 | Murakami et al. ........... 525/124 |
| 5,006,612 A | 4/1991 | Danick et al. ............... 525/438 |
| 5,212,243 A | 5/1993 | Toyoda et al. ............... 525/187 |
| 5,407,707 A | 4/1995 | Simeone et al. ............. 427/410 |
| 5,436,311 A | 7/1995 | Hoebeke et al. ............. 525/174 |
| 5,525,370 A | 6/1996 | Hoebeke et al. ............. 427/195 |
| 5,663,265 A | 9/1997 | Epple et al. ................. 526/320 |

FOREIGN PATENT DOCUMENTS

| | | | |
|---|---|---|---|
| EP | 0 104 424 | 8/1983 | ............ C08G/18/80 |
| EP | 0 038 635 | 3/1985 | ............ C09D/3/66 |
| EP | 0 165 207 | 5/1985 | ............ C09D/3/58 |
| EP | 0 242 714 A2 | 10/1987 | ............ C09D/5/46 |
| EP | 0 366 608 A2 | 5/1990 | ............ C09D/5/03 |
| EP | 0 551 064 A2 | 12/1992 | ......... C09D/167/02 |
| EP | 0 702 064 A2 | 8/1998 | ............ C09D/5/03 |
| GB | 1391863 | 4/1975 | ............ C08G/59/32 |
| WO | WO92/01748 | 2/1992 | ............ C08L/67/02 |

OTHER PUBLICATIONS

Hong et al., "Low Gloss in Powder Coatings," *American Paint & Coatings Journal*, 43–55 (Jun. 21, 1993).
International Search Report, PCT/US 00/21696, Date of Mailing: Mar. 6, 2001.

*Primary Examiner*—Patricia A. Short
(74) *Attorney, Agent, or Firm*—Myers, Bigel, Sibley & Sajovec, PA

(57) ABSTRACT

The present invention provides a low gloss powder coating composition comprising a polyester having hydroxyl and carboxyl groups and glycidyl-containing acrylic copolymer, the copolymer having a $T_g$ less than about 55° C. and a number average molecular weight greater than about 8000.

9 Claims, No Drawings

BURNISH RESISTANT POWDER COATING COMPOSITION

This application is a divisional of U.S. pat. application Ser. No.09/386,882, filed Aug. 31, 1999, now U.S. Pat. No. 6,310,139, the disclosure of which is incorporated by reference herein in its entirety.

FIELD AND BACKGROUND OF THE INVENTION

This invention relates to a powder coating composition, and more particularly a powder coating composition that exhibits excellent resistance to degradation and is burnish resistant.

Powder coating compositions are now being used in a wide variety of painting techniques. They have become increasingly desirable, particularly in the automotive and track industries, for various reasons including those related to ecology, health and safety. For example, powder coating compositions can reduce the amount of volatile solvents used as compared to liquid paints. After curing, typically using heat, only a very small amount, if any, of volatile solvent is given off to the environment.

Various powder coating compositions have been suggested. For example, a powder coating composition with excellent exterior durability can be prepared by reacting an acid group-containing acrylic polymer and a curing agent, triglycidyl isocyanurate (TGIC). Such coating compositions, however, often have poor stability and physical properties.

U.S. Pat. No. 4,499,239 to Murakami et al. proposes a composition comprising 60 to 97 percent by weight of a linear polyester resin having an acid number of 15 to 200 mg KOH/g and 3 to 40 percent by weight of a glycidyl group-containing acrylic polymer, and optionally is modified with a vinyl monomer such as methyl methacrylate. Powder coating compositions comprising a copolymer of glycidyl methacrylate, an ethylenically unsaturated compound, and a crosslinking agent formed in an anhydride of a dicarboxylic acid are proposed in U.S. Pat. Nos. 3,758,632, 3,781,379, 2,888,943 and 4,091,049 to Labana et al.

These compositions, however, tend to provide high gloss finishes. Powder coating compositions having a low gloss (matte) finish are becoming more desirable for use in automotive interiors, and for wheel rims, bumpers and the like. A common way to reduce gloss is to incorporate a filler such as talc or silica into the composition. It is believed that the gloss is lowered by the formation of minute surface irregularities on the coating. Another alternative is proposed in U.S. Pat. Nos. 5,436,311 and 5,525,370 to Hoebeke et al. which proposes a low gloss composition using a high percentage of methyl methacrylate in the composition. Other low gloss compositions are proposed in U.S. Pat. Nos. 4,242,253 to Yallourakis, and U.S. Pat. No. 5,491,202 to Umehara et al.

These low gloss compositions, however, are often not resistant to burnish. Namely, an article having low gloss will change to a high gloss after marring, scratching or rubbing. There is also a need to improve weatherability and durability.

Thus, there remains a need for a low gloss powder coating composition that has excellent resistance to degradation, namely is durable and weather resistant, and is burnish resistant.

SUMMARY OF THE INVENTION

To this end, the present invention provides a burnish resistant and durable powder coating composition comprising a polyester resin having hydroxyl and carboxyl groups and a glycidyl-containing acrylic copolymer wherein the polyester resin has a glass transition temperature (hereinafter "$T_g$") less than about 55° C. and the glycidyl-containing acrylic copolymer has a number average molecular weight greater than about 8000.

In another embodiment, the present invention provides a powder coating composition comprising about 20 to 90 percent by weight of a polyester resin having hydroxyl and carboxyl groups, preferably having a $T_g$ of less than about 55° C., about 5 to 60 percent by weight of a glycidyl-containing acrylic copolymer and about 2 to 20 percent by weight of a blocked polyisocyanate derivative.

In still another embodiment, the present invention provides a method of preparing a burnish resistant coating on an article of manufacture. The method comprises applying to the article a powder coating composition comprising a polyester resin having hydroxyl and carboxyl groups and a glycidyl-containing acrylic copolymer and curing the coated article of manufacture preferably at a temperature of about 120° C. to 220° C.

DETAILED DESCRIPTION OF THE INVENTION

As summarized above, the powder coating comprises a polyester resin including carboxyl and hydroxyl functionality and a glycidyl-containing acrylic copolymer. The polyester resin includes carboxyl and hydroxyl functionality, i.e., it is a "bi-functional" polyester. The amount of polyester, by weight is preferably from about 20 to 90 percent, and preferably is about 25 to 75 percent by weight of the powder coating composition.

With respect to the carboxyl portion of the polyester resin, the starting acid and alcohol components thereof may be known conventional dibasic and polybasic acids, and dihydric and polyhydric alcohols, respectively. Typical examples of the acid component include terephthalic acid, isophthalic acid, phthalic acid, methylterephthalic acid, trimellitic acid, pyromellitic acid, adipic acid, sebacic acid, succinic acid, maleic acid, fumaric acid, tetrahydrophthalic acid, methyltetrahydrophthalic acid, hexahydrophthalic acid, methylhexahydrophthalic acid, and the anhydrides thereof. Typical examples of the alcohol component include ethylene glycol, propylene glycol, 1,3-butanediol, 1,4-butanediol, 1,6-hexanediol, neopentyl glycol, isopentyl glycol, bishydroxyethyl terephthalate, hydrogenated bisphenol A, an ethylene oxide adduct of hydrogenated bisphenol A, a propylene oxide adduct of hydrogenated bisphenol A, trimethylolethane, trimethylolpropane, glycerol, pentaerythritol and 2,2,4-trimethylpentane-1,3-diol. Monoepoxy compounds can also be used as one glycol component. The polyester resin preferably has an acid value of about 5 to 100 mg KOH/g, and more preferably about 10 to 30 mg KOH/g.

With respect to the hydroxyl portion, the above alcohol components may be used, namely ethylene glycol, propylene glycol, 1,3-butanediol, 1,4-butanediol, 1,6-hexanediol, neopentyl glycol, isopentyl glycol, bishydroxyethyl terephthalate, hydrogenated bisphenol A, an ethylene oxide adduct of hydrogenated bisphenol A, a propylene oxide adduct of hydrogenated bisphenol A, trimethylolethane, trimethylolpropane, glycerol, pentaerythritol and 2,2,4-trimethylpentane-1,3-diol. The polyester resin has a hydroxyl value of about 5 to 100 mg KOH/g, preferably about 10 to 30 mg KOH/g. Preferably, the polyester resin is a softer resin, namely it has a $T_g$ of less than about 55° C.

The blocked isocyanate derivative reacts With the hydroxyl group of the polyester. The amount of blocked polyisocyanate derivative is preferably from about 1 to 30 percent, and more preferably about 2 to 20 percent by weight of the total powder coating composition. Typical blocked isocyanates include products obtained by blocking the free isocyanate groups present in aliphatic, aromatic and alicyclic isocyanates such as hexamethylene diisocyanate, xylylene diisocyanate and isophorone diisocyanate or adducts of these. isocyanates with compounds having active hydrogen, with conventional blocking agents such as methanol, isopropanol, butanol, ethyl lactate and e-carprolactam. Examples of the compounds having active hydrogen are various low-molecular weight compounds such as ethylene glycol, propylene glycol, butylene glycol, trimethylopropane, glycerol, ethylenediamine and hexamethylenediamine, and various high-molecular-weight compounds such as polyols, polyethers, polyesters and polyamides.

Another class of blocked isocyanates derivatives are uretdione hardeners. Suitable uretdione hardeners are self-blocked uretdione groups containing polyisocyanates. These uretdione group-containing organic polyisocyanates can be prepared in accordance with well-known methods by dimerization of the corresponding organic polyisocyanate. See Saunders, J. H. and Frisch, K. C., *Polyurethane: Chemistry and Technology, Part I*, pages 91-94 (1962) and U.S. Pat. No. 4,522,975 the disclosure of which is incorporated by reference herein in its entirety. Any suitable organic polyisocyanate, or mixture of polyisocyanates, which is susceptible to dimerization can be used. Typical examples include the following and mixtures thereof: 2,4-toluene diisocyanate; 2,6-toluene diiosycanate; isomeric mixtures of 2,4- and 2,6-toluene diisocyanate; ethylene diisocyanate; propylene diisocyanate; methylene-bis (4-phenyl isocyanate); methylene-bis (4-cyclohexyl)isocyanate; xylene diisocyanate; 3,3'-bitoluene-4-4'-diisocyanate; hexamethylene diisocyanate; naphthalene 1,5-diisocyanate; isophorone diisocyanate; and the like. Exemplary uretdione hardeners include Vestagon available from Huils, Germany or Crelan available from Bayer, Germany.

Another class of blocked isocyanate derivative is a 1,3,5 triazol available from Bayer as NB 650301 such as blocked isocyanate derivative is used when a low temperature (e.g., less than about 150° C.) cure is desired.

The glycidyl-containing acrylic copolymer is a polymer or copolymer obtained by using (β-methyl)glycidyl (meth) acrylate as a starting material. It reacts with the carboxyl portion of the polyester resin. The term "copolymer" as used herein means a polymer of two or more different monomers. The glycidyl-containing acrylic copolymer is obtained in a customary manner, for example, from about 10 to 100 percent by weight, preferably about 15 to 60 percent by weight, of at least one (β-methyl)glycidyl (meth)acrylate selected from the group consisting of glycidyl acrylate, glycidyl methacrylate, β-methyl glycidyl acrylate and β-methyl glycidyl methacrylate. Especially preferred as the (β-methyl)glycidyl (meth)acrylate is glycidyl methacrylate either alone or in combination with β-methylglycidyl methacrylate. For the purpose of this invention, the glycidyl-containing acrylic copolymer preferably has a number average molecular weight of greater than about 8000 and less than about 20,000, and preferably 8,000 to 16,000, and an epoxy equivalent of greater than about 425 and less than about 2000, and more preferably 525 to 650. Preferably about 5 to 60 percent by weight of the total powder coating composition is the glycidyl-containing acrylic copolymer.

The remainder of the copolymer can be preferably about 0 to 80 percent by weight, preferably about 20 to 60 percent by weight, of another vinyl monomer. Typical examples of the other vinyl monomer which may be used as a comonomer to be reacted with (β-methyl)glycidyl (meth)acrylate are one or more of the following: styrene, (meth)acrylic acid esters (e.g., methyl methacrylate), furmaric acid diesters, acrylonitrile and acrylamide. In embodiments wherein weatherability is an issue, the so-called other vinyl monomer content is preferably reduced to less than about 30 percent by weight, particularly when the other vinyl monomer is styrene.

The glycidyl-containing acrylic copolymer can also be modified with a monobasic acid, for example, by using about 5 to 70 percent by weight, preferably about 15 to 60 percent by weight, of at least one (β-methyl)glycidyl (meth) acrylate selected from glycidyl acrylate, glycidyl methacrylate, β-methyl glycidyl acrylate and β-methylglycidyl methacrylate, preferably about 0 to 60 percent by weight, more preferably about 20 to 50 percent by weight, of another vinyl monomer, and preferably about 1 to 20 percent by weight, more preferably about 2 to 10 percent by weight, of the monobasic acid. Examples of the monobasic acid are methyl acrylic acid, benzoic acid, p-tert-butylbenzoic acid, hydrogenated products of benzoic acids, caprylic acid, lauric acid, myristic acid, palmitic acid, stearic acid, arachic acid, behenic acid, lignoceric acid, and isomers thereof with branched alryl groups. Polybasic acids which are esterified or etherified leaving only one carboxyl group may also be used as the monobasic acid. Modification of the glycidyl-containing acrylic polymer with a monobasic acid can be carried out as described in U.S. Pat. No. 4,499,239 to Murakami et al., the disclosure of which is incorporated herein in its entirety by reference. Preferably, the glycidyl-containing acrylic copolymer has a $T_g$ of less than about 60° C.

The copolymers are prepared using conventional techniques known to those skilled in the art. Preferably the monomers are prepared by free radical polymerization in the presence of an initiator. Suitable free radical initiators include di-tertiary butyl peroxide, benzoyl peroxide, deconyl peroxide, azobisisobutyronitrile, and tertiary butyl per-octoate. The initiators are preferably present in amounts of from about 0.1 to 5 percent.

A powder coating composition having improved performance can optionally be obtained by the addition of a polyepoxy resin. The polyepoxy resin serves to improve the corrosion resistance and mechanical strength of the film, and denotes a resin preferably having at least 2, more preferably 2 to 3, epoxy groups per molecule and an epoxy equivalent preferably of 80 to 2,000, more preferably 100 to 1,000. Known epoxy resins may be used, and typical examples include diglycidyl ethers of bisphenols and glycidyl ester ethers of hydroxybenzoic acid; polyglycidyl ethers of polyhydric alcohol, such as ethylene glycol diglycidyl ether or trimethylol propane triglycidyl ether; glycidyl esters of dibasic acids, such as diglycidyl terephthalate; alicyclic polyepoxides such as diglycidyl ethers of hydrogenated bisphenols or (3,4-epoxy-6-methylcyclohexyl)methyl ester of 3,4-epoxy-6-methyl-cyclohexanecarboxylic acid; and triglycidyl isocyanurate. The amount of the polyepoxy resin is preferably about 0.5 to 25 percent by weight, more preferably about 1 to 5 percent by weight. The polyepoxy resin suitably has a number average molecular weight of preferably 300 to 5,000, more preferably 500 to 3,000.

A flow control agent may be included in an amount preferably from about 0.1 to 5 percent by weight percent of the total powder composition. In general, the flow control agent should be a polymer having a number average molecular weight of at least 1000 and a $T_g$ preferably about 50° C. below the glass transition temperature of the compound copolymer. This flow control agent may be an acrylic polymer which may be prepared by polymerization of acrylate and methacrylate monomers in bulk or in suitable solvents using well known free radical initiators. The amount of initiator and polymerization conditions are chosen so that the polymer has a molecular weight preferably above 1000, more preferably about 5000 and most preferably between about 6000 and about 20,000. Among the preferred acrylic polymers useful as flow control agents are polylauryl acrylate, polybutyl acrylate, poly (2-ethylhexyl acrylate), polylauryl methacrylate and polyisodecyl methacrylate.

Although siloacrylate flow control agents are preferred, fluorinated polymers having a surface tension, at the baking temperature of the powder, lower than that of the copolymer used in the mixture may be employed. Preferred flow control agents, if the agent is a fluorinated polymer are esters of polyethyleneglycol or polypropylene glycol and fluorinated fatty acids. For example, an ester of polyethyleneglycol of molecular weight preferably over 2500 and perfluoro octanoic acid is a useful flow control agent. Polymeric siloxanes of molecular weight ($M_n$) preferably over 1,000, and more preferably 1,000 to 20,000, may also be useful as flow control agents, e.g., alkyl substituted silozanes such as polydimethyl siloxanes, and halogenated siloxanes such as poly 3,3,3-trifluoropropylnethyl silozane), poly (perfluorodimethyl siloxane, poly(pentafluorophenyl methyl siloxane), etc.

Since the powder coating compositions of the invention may be applied to articles by electrostatic spray techniques, the composition may include a small weight percent of an antistatic agent. In particular, the antistatic agent is included in a range preferably from about 0.05 to about 1.0 weight percent of the total powder composition. Suitable antistatic agents include, but are not limited to tetraalkyl ammonium salts as discussed previously and which also serve as catalysts. Other suitable antistatic agents include: alryl poly (ethyleneoxy) phosphate or alkylauryl poly (ethyleneoxy) phosphates such as ethyl benzyl poly ethyleneoxy) -phosphate, polyethyleneimine, poly (2-vinyl pyrolidone), pyridinum chloride, poly (vinyl pyridimium chloride), polyvinyl alcohol, and inorganic salts.

A plasticizer may be used in the powder coating compositions of this invention if desired. The types of plasticizers used very often include adipates, phosphates, phthalates, secacates, polyesters derived from adipic acid or azelaic acid, and epoxy or epoxidized plasticizers. Exemplary of the many plasticizers which may be employed are: dihexyl adipate, diisooctyl adipate, dicyclohexyl adipate, triphenyl phosphate, tricresyl phosphate, tributyl phosphate, dibutylphthalate, , dioctylphthalate, butyl octyl phthalate, dioctyl sebacate, butyl benzyl sebacate, dibenzyl sebacate, butanediol-1,4diglycidyi ether and cellulose acetate butyrate.

Pigments may be included in an amount preferably from 0.1 to 50 percent by weight. Suitable pigments include titanium dioxide, iron oxides, organic dyestuffs carbon black, etc. Metallic pigments such as aluminum may be included to provide a metallic appearance.

The present invention provides a method of preparing a burnish resistant coating on an article of manufacture which includes applying the above powder coating composition to the article. The powder coating composition may be applied by known coating methods such as electrostatic coating, electrostatic spray coating or fluidized coating. It may be applied to articles such as automotive exterior or interiors, appliance, lawn furniture, metal fixtures, and the like.

The coated film so prepared is baked or cured by a conventional method at a temperature preferably of about 300° to 400° F. for at least 5 minutes and preferably from 5 to 30 minutes to give a cured film having superior appearance represented by superior smoothness, low gloss and outstanding weatherability and is resistant to burnish.

EXAMPLE

The following Example illustrates the practice of the present invention. The Example should not be construed as limiting the invention to anything less than that which is disclosed. The process conditions are as follows:

Premixing: Henschel FM-10 Premixer, residence time=60 seconds per batch

Melt-Mix Extrusion: Werner & Pfleiderer ZSK-30, Zone 1:100 C, Zone 2: 80 C, Screw Speed:250 RPM, Feed Rate: 60 lbs./hr.

Grinding: Brillrnann Retsch Mill, 15,000 RPM, 0.5 mm screen

Sieving: 140 mesh, Ro-Tap

Spray equipment: Nordson Versa-Spray 100, applied at −80kV

| Raw Material | Parts by Weight |
|---|---|
| EM-33377 (1) Bi-functional polyester | 56.0 |
| EM-27284 GMA acrylic (1) | 31.0 |
| Blocked IPDI hardener (2) | 11.5 |
| Dicarboxylic Acid (3) | 1.5 |
| Flow Additive (4) | 1.0 |
| Benzoin (5) | 0.5 |
| Carbon Black (6) | 2.0 |
| Barytes (7) | 43.0 |
| Catalyst (8) | 0.2 |
| Tin Catalyst (9) | 0.35 |
| TOTAL | 146.4 |

(1) REICHHOLD
(2) HULS, Vestagon B-1530
(3) DUPONT, Dodecanedioc Acid, for enhanced film smoothness
(4) MONSANTO, Modaflow 200 Powder
(5) GCA CHEMICALS, Uraflow B
(6) COLUMBIAN CHEMICALS COMPANY, Raven 1255 Beads
(7) HUBER, Huberbrite 1
(8) AIR PRODUCTS, Curezol C17 imidazole for gloss stability
(9) SYNTHRON SPECIALITY CHEMICALS, Actiron DBT, urethane catalyst Such a composition is applied to a substrate and cured for 10 minutes at 204° C. The coated substrate is subjected to a burnishing event and checked with a SEM photograph. The coated composition was resistant to blemish. Various properties of the composition are detailed in Table 1.

TABLE 1

| Baking schedule | 10 minutes at 400° F. |
|---|---|
| Dry film thickness, mils | 2.5 |
| Gloss, 60°/85° | 4/8.5 |
| PCI smoothness rating (1–10, 10 = best) | 6 |
| Pencil hardness | 2H |
| Gardner impact, in./lbs. F/R | 160/160 |
| Crosshatch adhesion | 100% |
| Solvent cure test, 100 MEK double rubs | Full cure |

The foregoing is illustrative of the present invention and is not to be construed as limiting thereof. Although a few exemplary embodiments of this invention have been described, those skilled in the art will readily appreciate that many modifications are possible in the exemplary embodiments without materially departing from the novel teachings and advantages of this invention. Accordingly, all such modifications are intended to be included within the scope of this invention as defined in the claims. Therefore, it is to be understood that the foregoing is illustrative of the present invention and is not to be construed as limited to the specific embodiments disclosed, and that modifications to the disclosed embodiments, as well as other embodiments, are intended to be included within the scope of the appended claims. The invention is defined by the following claims, with equivalents of the claims to be included therein.

That which is claimed is:

1. A method of providing a burnish resistant coating on an article of manufacture, the method comprising applying to the article a powder coating composition comprising a polyester resin having hydroxyl and carboxyl groups, and having a $T_g$ less than about 55°, a glycidyl-containing acrylic copolymer, the copolymer having a number average molecular weight greater than about 8000 and a blocked isocyanate derivative for reacting with the hydroxyl group of the polyester resin, and curing the coated article of manufacture at a temperature of about 120° C. to 200° C.

2. The method according to claim 1, wherein said step of curing takes at least about 5 minutes.

3. The method according to claim 1, wherein the blocked isocyanate derivative is a uretdione group-containing organic polyisocyanate.

4. The method according to claim 1, wherein the polyester resin has a hydroxyl value of about 10 to 30 mg KOH/g and an acid value of about 10 to 30 mg KOH/g.

5. The method according to claim 1, wherein the glycidly-containing acrylic copolymer has a $T_g$ of less than about 60° C.

6. The method according to claim 1, wherein the glycidyl-containing acrylic copolymer is glycidyl methacrylate.

7. The method according to claim 1, wherein the glycidyl-containing acrylic copolymer has an epoxy equivalent weight of greater than about 425.

8. An article of manufacture prepared according to claim 1.

9. A method according to claim 1, wherein the powder coating composition comprises about 20 to 95 percent by weight polyester resin having hydroxyl and carboxyl groups, about 5 to 60 percent by weight of the glycidyl-containing acrylic copolymer, and about 2 to 20 percent by weight of the blocked isocyanate derivative.

* * * * *